United States Patent [19]
Johnson

[11] 4,197,684
[45] Apr. 15, 1980

[54] SIMULATED ROCK ASSEMBLY

[76] Inventor: Merlyn B. Johnson, 2904 Joan La., Billings, Mont. 59102

[21] Appl. No.: 949,960

[22] Filed: Oct. 10, 1978

[51] Int. Cl.² .............................................. A01G 1/08
[52] U.S. Cl. .......................................... 52/102; 47/33; 52/311; 428/15
[58] Field of Search ...................... 47/33; 52/102, 311, 52/676; 428/15; 156/61; 63/3, 4; 404/37–40

[56] References Cited

U.S. PATENT DOCUMENTS

| | | | |
|---|---|---|---|
| 1,813,055 | 7/1931 | Kannen | 47/33 |
| 2,282,559 | 5/1942 | Byers | 52/102 X |
| 2,532,524 | 12/1950 | Walker | 52/102 |
| 2,912,792 | 11/1959 | Venable | 47/33 |
| 3,559,338 | 2/1971 | Klingberg | 47/33 |

Primary Examiner—Henry F. Epstein
Attorney, Agent, or Firm—Arthur L. Urban

[57] ABSTRACT

A simulated rock assembly including a plurality of spaced rock-like members, connectors joining the rock-like members and end members extending from the end rock-like members; the rock-like members being molded of plastic material in a hollow configuration with an open face, the outer surface of the rock-like members having a rock pattern thereon, the opposite ends of the rock-like members having heavier sections adjacent the open face thereof, at least a pair of spaced openings in each heavier section, the openings extending generally perpendicular to the open face of the rock-like members, the connectors comprising at least two twisted metal wires, the wires diverging from each other adjacent to the ends of each connector with the end portion of each diverging wire being bent substantially perpendicular to the length of the connector for insertion thereof into the pairs of openings in the heavier end sections of the rock-like members, the end members comprising at least two twisted metal wires and the wires adjacent to one end of each end member diverging from each other with their end portions being bent substantially perpendicular to the length of the end member for insertion thereof into the pairs of openings in the heavier end sections of the rock-like members and the opposite end of each end member having stake-receiving means.

9 Claims, 8 Drawing Figures

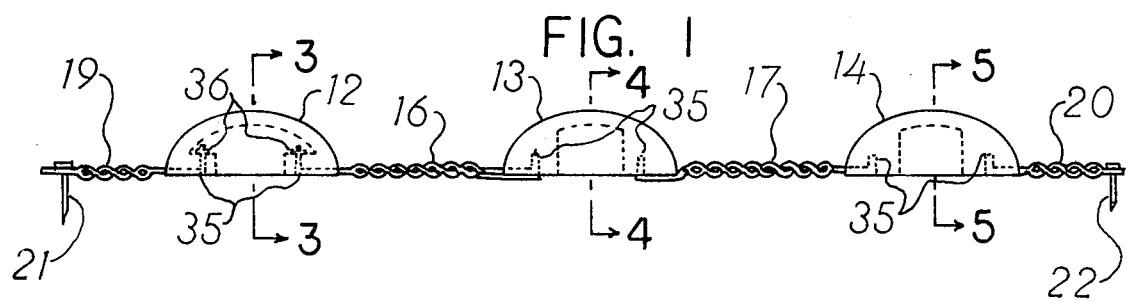
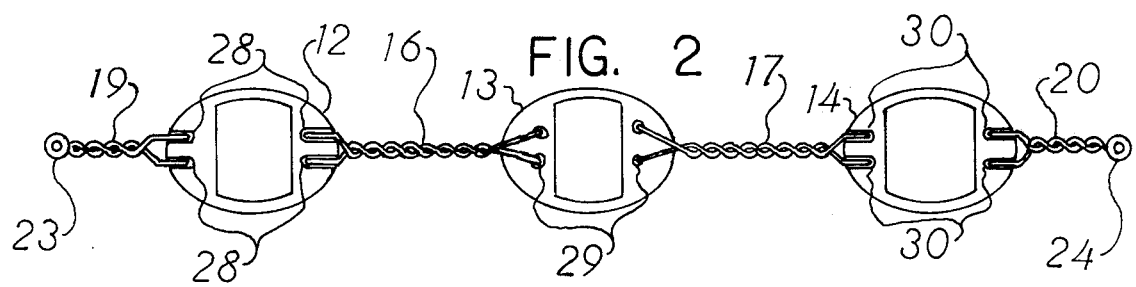
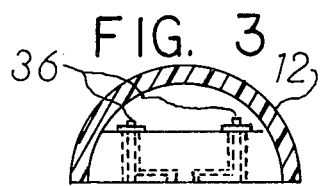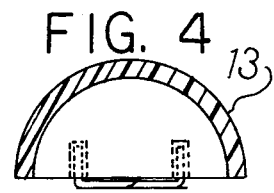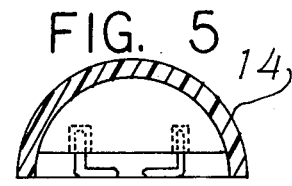
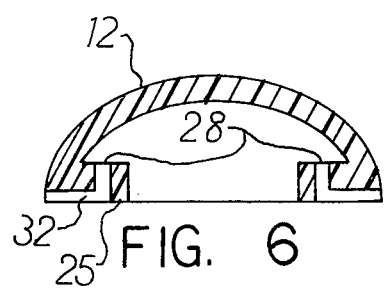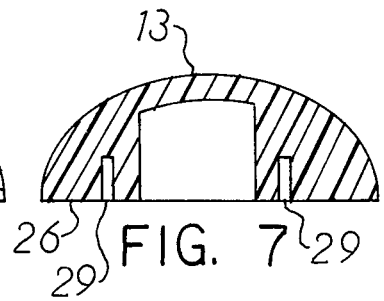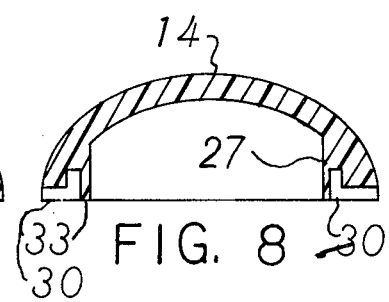

SIMULATED ROCK ASSEMBLY

This invention relates to a novel assembly of simulated rocks and more particularly relates to a new decorative assembly of such rock-like members.

Landscapers often use rocks or stones as decorative features in their landscape designs. The rocks serve as accent points or borders for flower beds or around shrubs and trees. Sometimes the rocks are colored or painted to provide a contrast with the surrounding area.

One of the problems in the use of rocks, stones and the like in landscape designs is the difficulty in maintaining the appearance of the area around the rocks. For example, if the rocks are placed in a lawn area, the grass will quickly grow up around the rocks. The tall grass if left untrimmed will hide the rocks and of itself present an unkempt appearance instead of the desired enhancement which motivated the placement of the rocks.

Maintenance of the lawn area under these conditions requires greater time and effort. Since the grass around the rocks cannot be mowed with a lawnmower, it is necessary either to use a trimmer to cut this grass or to else to move each rock from its normal position so that a lawnmower can be used over the entire area. In either case, extra time and effort are required for proper maintenance of the lawn area. Furthermore, if it is desired to change the design, a considerable amount of time and effort must be additionally expended.

Some gardeners may consider the time and effort required for the utilization of rocks in a landscaping plan to be a worthwhile investment because of the aesthetic result achieved, however, other individuals may not be able or willing to spend the time and effort for this purpose. Since a great deal of stooping and lifting of rocks must be done, aged persons or those with other infirmities may not be able to do the work. In such cases, it would be necessary to hire the work done or else to have the placement done by others and then purchase a special power trimmer to keep the grass short. However, this is not an ideal solution to the problem since it only changes it to a financial burden.

The present invention provides a novel assembly with a rock-like appearance. The rock assembly of the invention significantly reduces the time and effort required to maintain the surrounding area. Not only is maintenance simplified, but also the rock assembly is light in weight so that it is convenient to place and move even by youngsters or persons with infirmities. In addition, the rock assembly of the invention covers a relatively large area which facilitates and simplifies placement and movement. This also eliminates the necessity for the placement of individual rocks. Moreover, the rock assembly can be used conveniently on steep slopes without digging and/or careful anchoring of each rock.

Another advantage of the novel rock assembly of the present invention is the simplicity of its design. The rock assembly can be assembled quickly with a minimum of instructions without special skills or tools. Moreover, the design of the rock assembly permits wide variations in appearance. In addition, the gardener can reassemble the rocks quickly and conveniently when he desires to change the design.

A further advantage of the novel rock assembly of the invention is that it is fabricated of man-made materials. This provides the potential for surface effects which are not available with natural rocks. Also, the materials employed in the fabrication of the rock assembly are commercially available and relatively inexpensive. In additon, the replacement of damaged components and/or the addition of extra components can be accomplished conveniently at minimum cost.

Other benefits and advantages of the novel rock assembly of the present invention will be apparent from the following description and the accompanying drawings in which:

FIG. 1 is a side elevation of one form of the novel rock assembly of the invention;

FIG. 2 is a bottom view of the rock assembly shown in FIG. 1;

FIG. 3 is a sectional view taken along line 3—3 of FIG. 1;

FIG. 4 is a sectional view taken along line 4—4 of FIG. 1;

FIG. 5 is a sectional view taken along line 5—5 of FIG. 1;

FIG. 6 is an enlarged side elevation in section of the left rock member of the rock assembly shown in FIG. 1;

FIG. 7 is an enlarged side elevation in section of the center rock member of the rock assembly shown in FIG. 1; and FIG. 8 is an enlarged side elevation in section of the right rock member of the rock assembly shown in FIG. 1.

As shown in the drawings, one form of the novel rock assembly of the present invention includes rock-like members 12, 13 and 14, connectors 16 and 17 and end members 19 and 20. The rock assembly is affixed to the ground (not shown) with stakes or pins 21 and 22 which engage stake-receiving means 23 and 24 at the free ends of end members 19 and 20.

Rock-like members 12, 13 and 14 are molded of plastic in a hollow configuration simulating rocks with a substantially flat open bottom face. Plastic materials suitable for the molding of the rock members include polystyrene, polyacrylics, polyesters, polyamides, polyolefins, polyepoxys and similar molding resins. The rock members may be formed from the molding resin alone or reinforced with fiber glass fibers or fabric, metal screening, rods or the like. The outer surface of the rock members may have a rock or other pattern formed during or after the molding operation.

The rock-like members include heavier sections at opposite ends thereof adjacent to the open bottom face. The heavier sections may be, for example, shallow inward extensions 25 as shown with rock member 12 (FIG. 6) or may be heavier sections extending the full distance to the dome portion of the rock member such as sections 26 and 27 of rock members 13 and 14, respectively (FIGS. 7 and 8).

At least one pair of spaced openings 28, 29 and 30 are located in each heavier section. The openings which extend generally perpendicular to the open bottom face of the rock members are of a size and shape to receive the wire ends of connectors 16 and 17 and end members 19 and 20 as will be described hereinafter. The openings may communicate with the outer surface of the rock member through a groove or recess 32 of rock member 12 or a recess 33 of rock member 14. Advantageously, the spacing between the openings is between about 1½ and 6 inches and preferably between about 2 and 4 inches, depending upon the size and configuration of the rock members.

Connectors 16 and 17 comprise at least two twisted wires. The wires diverge from each other adjacent the ends of each connector. In addition, end portions 35 of connectors 16 and 17 are bent substantially perpendicular to the length or longitudinal axis of the connectors. The bent end portions 35 fit into the respective openings 28, 29 and 30 of the rock members. In cases where the bent end portions 35 extend through a shallow inwardly extending section 28 as with rock member 12, fasteners 36 may be affixed to the exposed ends of the bent portions. Preferably, as shown, the bent end portions extend in the same direction from the length of the connectors for proper alignment of the adjacent rock members.

End members 19 and 20 also comprise at least two twisted metal wires. One end of each of the end members is formed similarly to the ends of the connectors with diverging wires and bent end portions for insertion into the openings in the bottom face of the rock members. The opposite or free end of each end member has a portion 23 or 24 which is capable of receiving a stake or pin 21 or 22 as mentioned above for anchoring the rock assembly. The stake-receiving means 23 and 24 advantageously include closed circular portions. The closed circular portions can be integral wire loops or as shown may be a separate bracket with an opening and a shank portion which is affixed to the free end of the end member 19 or 20.

Advantageously, the connectors 16 and 17 and the end members 19 and 20 are formed of corrosion-resistant wire. The size of the wire will depend to a large extent upon the size and spacing of the rock members. It is important that the twisted wires of the connectors and the end members be sufficiently stiff to give the rock assembly structural rigidity. On the other hand, the twisted wires should possess sufficient malleability that the connectors and end members can be bent or curved to make the desired changes in the configuration of the rock assembly so that it will follow the terrain.

The rock assembly of the present invention advantageously is fabricated by molding a number of rock-like members 12, 13 and/or 14 with the open bottom face and openings 28, 29 and 30 in the heavier end sections 25 or 26. Next wires are twisted for connectors 16 and 17 and end members 19 and 20. The twisted wires for the connectors are separated at their ends so that the wires diverge and the end portions 35 are bent perpendicular to the longitudinal axis. The end members 19 and 20 each have one end formed as above for the connectors and the opposite end connected to the stake receiver 23 or 24.

The rock assembly is formed by assembling the rock-like members 12, 13 and 14 with the connectors 16 and 17 and the end members 19 and 20. The end portions 35 of the connectors and end members are inserted into the openings 28, 29 and 30 of the rock-like members. The rock assembly then is aligned by twisting the connectors and end members so the flat open faces of the rock-like members lie in the same plane.

The rock assembly is positioned as part of a landscape design, for example, as an edging of a flower bed. The connectors may be curved and bent as desired to form a straight or flowing pattern. The stakes 21 and 22 are inserted into receivers 23 and 24 in the end members and pushed or driven into the ground. This provides anchoring for the rock assembly.

When the grass has grown up around the rock assembly, the rock assembly can be moved conveniently by pulling one of the stakes from an end member and rotating the rock assembly about the stake remaining in the ground. The grass can then be cut with a conventional lawnmower. After cutting, the rock assembly can be pivoted back to its original position and the stake replaced. The procedure can be repeated at the opposite end of the rock assembly for the cutting of the grass at that end. If the length of the rock assembly is not excessive, it may be desirable to remove both stakes at the same time so that the rock assembly can be moved completely away from the area to be cut and then replaced after cutting.

The configuration and size of the rock assembly can be modified simply and conveniently by adding or subtracting rock-like members and connectors. Also, the arrangement and shape of the rock assembly can be changed simply by changing the curvature of the connectors.

The above description and the accompanying drawings show that the present invention provides a novel rock assembly which is simple to fabricate and to maintain. The rock assembly of the invention significantly reduces the time and effort formerly required to produce an aesthetically pleasing rock display in landscaping designs and plans. Also, the rock assembly eliminates the necessity for placing rocks individually.

The rock assembly of the invention provides a simple design which can be fabricated from commercially available components and materials relatively inexpensively. Furthermore, The components can be assembled quickly with a minimum of instruction and without special tools or skills. Similarly, the rock assembly of the invention can be modified conveniently when a change is desired or a repair is necessary. In addition, effects not achievable with natural rocks can be created if desired.

It will be apparent that various modifications can be made in the particular rock assembly described in detail and shown in the drawings within the scope of the invention. For example, the size and configuration of the rock-like members can be different for specific requirements. Also, the length and number of wires in the connectors and end members can be changed if desired. Therefore, the scope of the invention is to be limited only by the following claims.

What is claimed is:

1. A simulated rock assembly including a plurality of spaced apart rock-like members, connectors joining said rock-like members and end members extending from the end rock-like members; said rock-like members being molded of plastic material in a hollow configuration with an open face, the outer surface of said rock-like members having a rock pattern thereon, the opposite ends of said rock-like members having heavier sections adjacent the open face thereof, at least a pair of spaced openings in each heavier section, said openings extending generally perpendicular to said open face of said rock-like members, said connectors comprising at least two twisted metal wires, said wires diverging from each other adjacent to the ends of each connector with the end portion of each diverging wire being bent substantially perpendicular to the length of said connector for insertion thereof into the pairs of openings in the heavier end sections of said rock-like members, said end members comprising at least two twisted metal wires, the wires adjacent to one end of each end member diverging from each other with their end portions being bent substantially perpendicular to the length of said end member for insertion thereof into the pairs of openings in the heavier end sections of said rock-like members and the opposite end of each end member having stake-receiving means.

2. A simulated rock assembly according to claim 1 wherein said openings of said rock-like members are spaced between about 1½ and 6 inches.

3. A simulated rock assembly according to claim 1 wherein said openings of said rock-like members are spaced between about 2 and 4 inches.

4. A simulated rock assembly according to claim 1 wherein said stake-receiving means includes a closed circular portion.

5. A simulated rock assembly according to claim 1 wherein said rock-like members have recesses in the heavier sections of the open face extending from said openings to the outer surface of said rock-like members.

6. A simulated rock assembly according to claim 1 wherein the wires of said connectors and said end members are twisted a plurality of turns along their length.

7. A simulated rock assembly according to claim 1 wherein said wires of said connectors and said end members are corrosion resistant.

8. A simulated rock assembly according to claim 1 wherein said bent end portions of said connectors and said end members extend through said heavier end sections of said rock-like members and have fasteners secured to the ends thereof.

9. A simulated rock assembly according to claim 1 wherein said stake-receiving means of said end members include brackets.

* * * * *